US009532013B1

(12) United States Patent
McCusker et al.

(10) Patent No.: US 9,532,013 B1
(45) Date of Patent: Dec. 27, 2016

(54) SENSOR-BASED IMAGE(S) INTEGRITY DETERMINATION SYSTEM, DEVICE, AND METHOD

(71) Applicant: ROCKWELL COLLINS, INC., Cedar Rapids, IA (US)

(72) Inventors: Patrick D. McCusker, Walker, IA (US); Carlo L. Tiana, Portland, OR (US); Michael A. Peterson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 350 days.

(21) Appl. No.: 14/294,323

(22) Filed: Jun. 3, 2014

(51) Int. Cl.
*H04N 7/00* (2011.01)
*H04N 7/18* (2006.01)

(52) U.S. Cl.
CPC ..................... *H04N 7/183* (2013.01)

(58) Field of Classification Search
None
See application file for complete search history.

(56) References Cited

U.S. PATENT DOCUMENTS

| 7,617,022 | B1 | 11/2009 | Wood et al. | |
|---|---|---|---|---|
| 2010/0026525 | A1* | 2/2010 | Feyereisen | G01O 5/005 340/972 |

OTHER PUBLICATIONS

Airworthiness Approval of Enhanced Vision System, Synthetic Vision System, Combined Vision System, and Enhanced Flight Vision System Equipment; Jun. 22, 2010; Advisory Circular No. 20-167; U.S. Department of Transportation, Federal Aviation Administration.
Minimum Aviation System Performance Standards (MASPS) for an Enhanced Flight Vision System to Enable All-Weather Approach, Landing, and Roll-Out to a Safe Taxi Speed; Sep. 26, 2012; RTCA DO-341; RTCA, Inc.; Washington, DC.

* cited by examiner

*Primary Examiner* — Geepy Pe
(74) *Attorney, Agent, or Firm* — Daniel M. Barbieri; Donna P. Suchy; Angel N. Gerdzhikov

(57) ABSTRACT

A system, device, and method for determining the integrity of sensor-based image(s) are disclosed. The integrity determination system may include one or more sources of passive sensor-based image data, one or more sources of an active sensor-based image data, and an image processing unit ("IPU"). The IPU may receive passive sensor-based image data; receive active sensor-based image data; and (1) determine the integrity of at least the passive sensor-based image data by comparison of the passive sensor-based image data with the active sensor-based image data, and/or (2) combine the passive sensor-based image data with the active sensor-based image data to produce third image data from which a pilot may manually determine the integrity of the first image data.

20 Claims, 7 Drawing Sheets

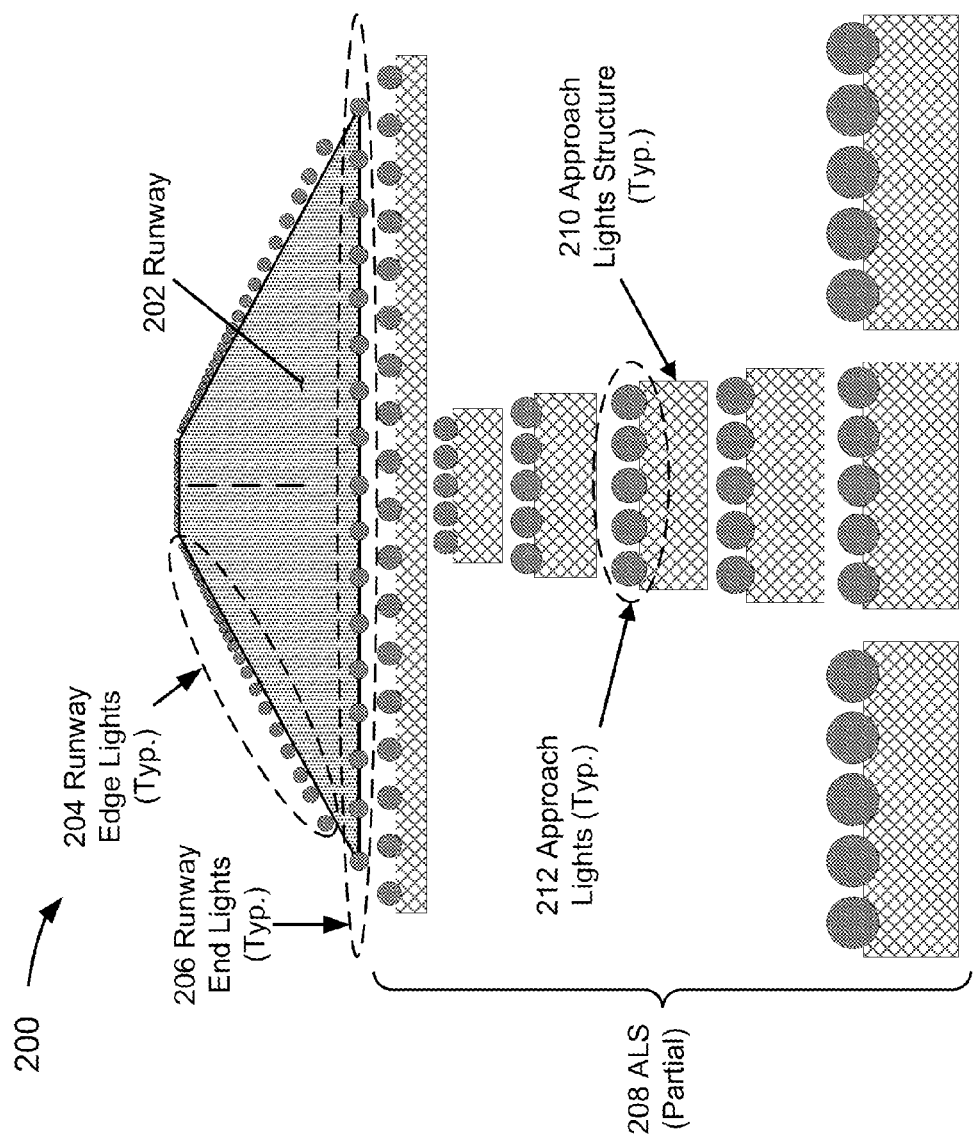

SENSOR-BASED IMAGE(S) INTEGRITY DETERMINATION SYSTEM, DEVICE, AND METHOD

BACKGROUND OF THE INVENTION

Field of the Invention

This invention pertains generally to the field of aircraft vision systems that present flight information to the pilot or flight crew of an aircraft.

Description of the Related Art

It is well-known that a Synthetic Vision System ("SVS") may generate image data representative of a synthetic, three-dimensional perspective of a scene in front of the aircraft. When provided to a display system, the synthetic image could be presented on the screen of a display unit. In addition, it is well-known that an Enhanced Vision System ("EVS") may generate image data representative of the real-world as an enhanced image of the scene in front of the aircraft, where such image data has been acquired by one or more fixed or steerable forward-looking image capture devices.

One purpose of the EVS is to provide imagery of the terminal area and runway environment to the flight crew during times when meteorological conditions prevent the crew from seeing the runway environment with natural, unaided vision. So, the EVS imagery can improve the situation awareness of the flight crew during the performance of instrument approach procedures.

Sensors employed in an EVS may generally fall into two categories: passive sensors and active sensors. Passive sensors may receive electromagnetic energy from the environment and may include visible light and infrared cameras. Active sensors may transmit electromagnetic energy into the environment and then receive electromagnetic energy reflected from the environment; a radar system is a common active sensor. Generally, passive and active sensors operate in different ranges of the electromagnetic spectrum. As such, passive sensors are subject to interference (i.e., an absorption of energy) from different meteorological conditions as compared with active sensors. The use of both passive and active sensors in an EVS may increase the availability of the system, for instance, by decreasing the odds that the EVS cannot produce an image to present to the crew.

Passive sensors such as cameras may produce video images captured from the point of view of the sensor. If the passive sensor is installed in an appropriate place on the nose of an aircraft, the pilot can be presented with a video image that is very nearly the same as his or her point of view through the cockpit windows.

Generally, an active sensor does not generate the same kind of video images produced by passive sensors. Instead, the active sensor transmits energy into the outside world and measures reflected energy from the outside world. The active sensor then maps the reflected energy into a three-dimensional ("3-D") model with reference typically made to a polar coordinate system. This three-dimensional data can then be rendered into an image that is very much like the image produced by the passive sensor.

Since active sensor data is captured in a 3-D model, there is an opportunity for active sensors to produce radar-based video imagery with a different point of view of the outside world than is produced by passive sensors. For example, the classic weather radar system generates a 3-D model of the reflectivity of a thunderstorm from which a top-down view the weather system may be generated. The top-down view could be presented on an electronic moving map so that the crew sees the weather system in the context of the flight plan, the location of navigation aids, and the location of other traffic that are also presented on the electronic moving map.

The Radio Technical Commission for Aeronautics ("RTCA"), Inc. has published a Document ("DO") identified as RTCA DO-341 and entitled "Minimum Aviation System Performance Standards (MASPS) for an Enhanced Flight Vision System to Enable All-Weather Approach, Landing, and Roll-Out to a Safe Taxi Speed," which is incorporated by reference in its entirety. DO-341 defines high level requirements for implementing an enhanced flight vision system ("EFVS") to allow landing and rollout operations of aircraft in low visibility conditions of a runway visual range ("RVR") of 300 feet; although the meanings underlying the terms EVS and EFVS are nearly synonymous, those skilled in the art understand that the two terms are not necessarily identical to one another. As embodied herein, an EVS may be considered as any system (which could include an EFVS) for generating an enhanced image presentable on a Head-Up Display ("HUD"), a Head-Down Display ("HDD"), or any other properly-configured display unit with or without symbology being included.

At the time of this writing, the minimum architecture suggested in DO-341 includes: (1) dual image sensors to generate images of the runway environment, (2) dual HUDs to present images to the pilot flying ("PF") and pilot monitoring ("PM"), and (3) dual HDDs to present images to the PF and PM. Also, DO-341 assumes that the HUD is essential for the PF to maintain control of the aircraft. If the HUD of the PF fails, control of the aircraft must transition to the PM who must have a functional HUD. The HDDs are back up display devices.

The minimum architecture suggested by DO-341 may be deficient or inadequate to meet the expected system availability and integrity requirements to support landing and rollout operations in the low visibility conditions of 300 feet RVR. The deficiencies in the architecture may include, but are not limited to, (1) an inability to detect and isolate system faults is a dual sensor system (i.e., the system cannot vote between numerous sensors to determine if any specific sensor has failed), (2) a failure of the entire EVS if one-sensor EVS is used, where changing meteorological conditions may block the part of the range of electromagnetic spectrum which the sensor is configured to detect (e.g., fog rolls in and dual infrared camera can no longer see the runway), and (3) an inability of a PF or a PM to verify the integrity of the enhanced vision image (or enhanced image) generated by the EVS when the PF or PM cannot see the outside world and, therefore, loses his or her basis to verify the integrity of the enhanced image.

BRIEF SUMMARY OF THE INVENTION

Embodiments of the inventive concepts disclosed herein are directed to a system, device, and method for determining the integrity of sensor-based image(s) from image data acquired by one or more passive image sensors and image data derived and/or generated from data acquired by an active sensor. With integrity determination of the sensor-based image(s), the integrity of an enhanced image may be determined automatically and/or by one or more pilots.

In one aspect, embodiments of the inventive concepts disclosed herein are directed to a system for generating a sensor-based image(s). The system may be comprised of one or more sources of passive sensor-based image data, a source of an active sensor-based image data, and an image processing unit ("IPU") configured to generate sensor-based image(s) data. In an additional embodiment, a display system could be employed to present the sensor-based image(s) on a HUD and/or HDD. In some embodiments, a source of manual input data could be included from which a pilot may select and compare two or more images and/or sources presented by the display system.

In another aspect, embodiments of the inventive concepts disclosed herein are directed to a device for determining the integrity of sensor-based image(s). This device may include the IPU configured to perform the method in the paragraph that follows.

In another aspect, embodiments of the inventive concepts disclosed herein are directed to a method for generating a sensor-based image(s), where the method could be performed by the IPU. When properly configured, the IPU may receive the passive sensor-based image data; receive the active sensor-based image data; and perform one or both of the operations. A first operation could combine first image data with second image data to produce third image data. A second operation could determine the integrity by comparison of the first image data with the second image data. In some embodiments, the third image data could be provided to the display system for the subsequent presentation of image(s) represented in the third image data on the HUD and/or HDD, where the image presented could depend upon a selection made by the pilot(s).

BRIEF DESCRIPTION OF THE DRAWINGS

FIG. 2A illustrates an actual runway environment of a runway at a decision point.

FIG. 2B illustrates an actual runway environment of a runway at the commencement of an approach-to-runway procedure.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
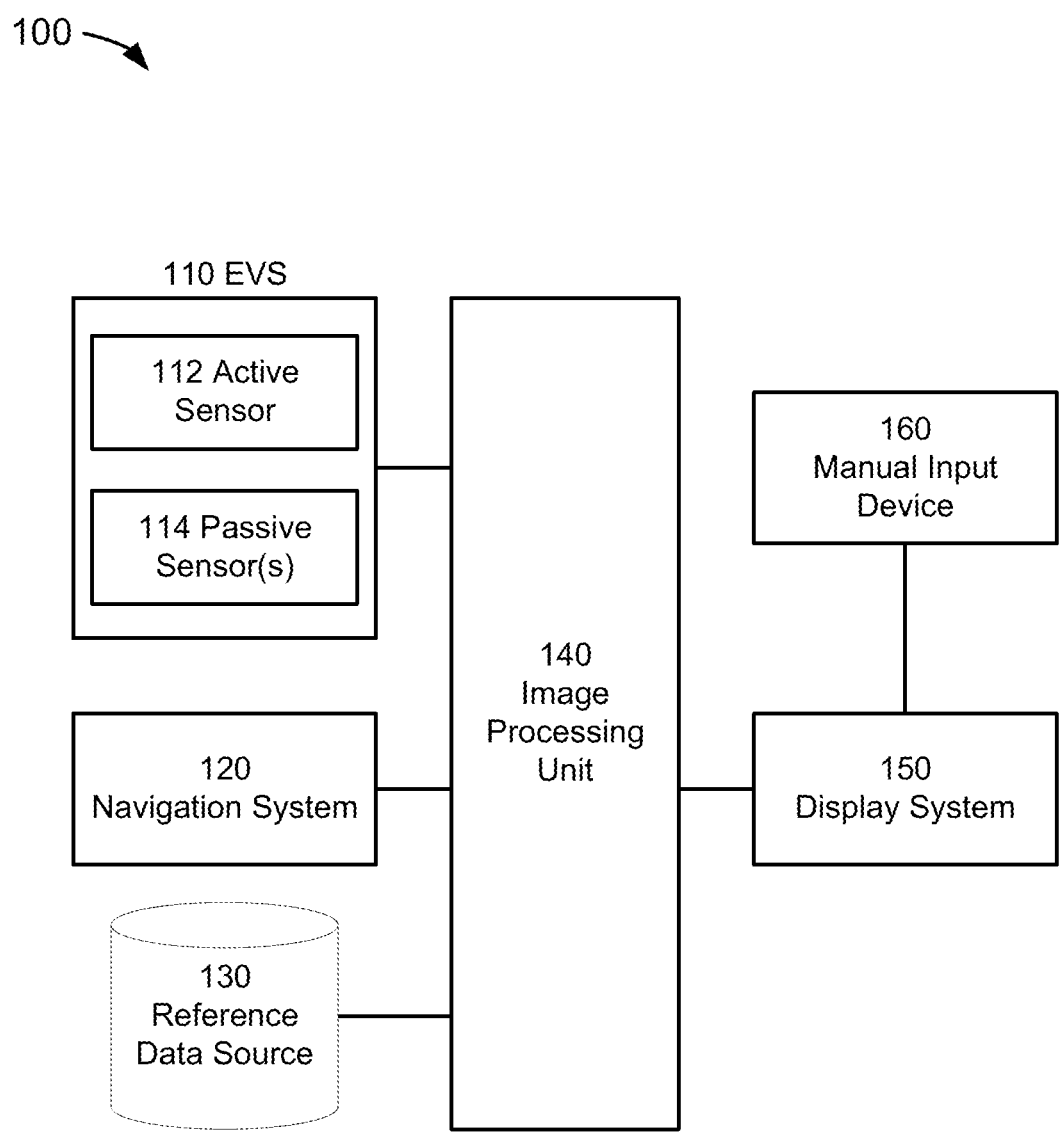
FIG. 1 depicts a block diagram of a sensor-based image(s) integrity determination system.

FIG. 1 depicts a block diagram of a sensor-based image(s) integrity determination system 100 suitable for implementation of the techniques described herein. The system 100 of an embodiment of FIG. 1 may be comprised of an enhanced vision system ("EVS") 110, a navigation system 120, a reference data source 130, an image processor unit ("IPU") 140, a display system 150, and a manual input device 160.

The EVS 110 may be any system, sub-system, or component thereof which could generate enhanced image data representative of a real-world image of the scene outside the aircraft (i.e., external scene) that is acquired by one or more image capture devices. The image capture device could be comprised of an active sensor 112 and/or one or more passive sensors 114.

The active sensor 112 could be comprised of any sensor designed or configured to transmit electromagnetic energy into the environment and then receive the transmitted electromagnetic energy that has been reflected from the environment. A common active sensor 112 that is well-known to those skilled in the art is a radar system such as, but not limited to, Millimeter Wave Radar systems. One example of a forward-looking radar system is the WXR-2100 Multi-Scan™ Hazard Detection Weather Radar System that has been developed by Rockwell Collins, Inc.

Generally, the radar system could be comprised of a forward-looking radar system such as a weather radar system configured to transmit microwaves within a sweep zone into the atmosphere via an antenna which, in turn, produces a focused beam. The radar system may control the direction of the beam by steering the antenna horizontally and vertically. When the signal strikes or reflects off an object such as meteorological conditions and/or lighting structures of the runway environment, part of the microwave energy is reflected back and received by active sensors such as the active sensor 112. The range of the object may be determined by measuring the elapsed time between the transmission and reception of the signal. The azimuth of the object may be determined as the angle to which the antenna was steered in the horizontal direction relative to the longitudinal axis of the aircraft during the transmission/reception of the signal. The elevation or elevation angle of the object may be determined as the angle to which the antenna was steered in the vertical direction relative to the longitudinal axis of the aircraft during the transmission/reception of the signal. As embodied herein, the active sensor 112 could acquire electromagnetic radiation produced by reflections off of lighting structures used in the runway environment including, but not limited to, structures of an approach lightings system and those structures used for runway end light and/or runway edge lights (e.g., metallic housings) known to those skilled art.

The passive sensor(s) 114 could be comprised of any sensor designed or configured to receive electromagnetic radiation emitting from the environment and could include cameras designed or configured to detect the electromagnetic radiation of visible light and/or infrared cameras designed or configured to detect the electromagnetic radiation of low-light, non-visible, and/or near-infrared radiation. Examples of electromagnetic radiation include the radiation emitted from lights that are employed in a runway lighting system ("RLS") and/or an approach lighting system ("ALS"). The EVS 110 may provide enhanced image data to the IPU 140 for subsequent processing as discussed herein.

In an embodiment of FIG. 1, the navigation system 120 could be comprised of any source(s) which provides data representative of aircraft information, where such information could be comprised of, but not limited to: heading, ground track, wind correction angle information, horizontal position, vertical position, pressure altitude, horizontal velocity (e.g., ground speed), vertical velocity, horizontal position accuracy, vertical position accuracy, horizontal velocity accuracy, vertical velocity accuracy, and/or ownership intended flight path information. It should be noted that data, as embodied herein for any source or system in an aircraft, including the navigation system 120, could be comprised of any analog or digital signal, either discrete or continuous, which could contain information or be indicative of information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation system 120 may include, but is not limited to, an air/data system, an attitude heading reference system, an inertial guidance system (or inertial reference system), a global navigation satellite system (or satellite navigation system), and/or a flight management system ("FMS") (which is comprised of, in part, a database), all of which are known to those skilled in the art. As embodied herein, the navigation system 120 may provide navigation data to the IPU 140 for subsequent processing as discussed herein.

In an embodiment of FIG. 1, the reference data source 130 could be comprised of any source of reference point data. The reference data source 130 could be comprised of a flight navigation database that may be part of the FMS and/or a taxi navigation database. The flight navigation database may contain records which provide reference data such as, but not limited to, surface data for taxiways and runways.

The reference data source 130 could be comprised of a taxi navigation database for storing airport data representative of, in part, airport surfaces, surface and surface edge lighting, and/or approach-to-runway lighting aids. The taxi navigation database could comprise an aerodrome mapping database ("AMDB") as described in the following document published by RTCA, Incorporated: RTCA DO-272A entitled "User Requirements for Aerodrome Mapping Information." DO-272A provides for aerodrome surface mapping requirements for aeronautical uses particularly on-board aircraft. Those skilled in the art appreciate that aviation standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB. As embodied herein, the reference data source 130 could provide reference point data to the IPU 140 for subsequent processing as discussed herein.

In an embodiment of FIG. 1, the IPU 140 may be comprised of any electronic data processing unit which executes software (i.e., computer instruction code) that could be stored, permanently or temporarily, in a digital memory storage device or a non-transitory computer-readable media (not depicted herein) including, but not limited to, RAM, ROM, CD, DVD, hard disk drive, diskette, solid-state memory, PCMCIA or PC Card, secure digital cards, and compact flash cards. The IPU 140 may be driven by the execution of software or computer instruction code containing algorithms developed for the specific functions embodied herein. The IPU 140 may be, or may include, one or more application-specific integrated circuits (ASICs) customized for the embodiments disclosed herein. Common examples of electronic data processing units are microprocessors, Digital Signal Processors (DSPs), Programmable Logic Devices (PLDs), and Programmable Gate Arrays (PGAs); however, for the embodiments herein, the term "processor" is not limited to such processing units and its meaning is not intended to be construed narrowly. For instance, the processor could also be comprised of a combination of electronic data processing units. As embodied herein, the IPU 140 could be a processor(s) used by or in conjunction with any other system of the aircraft including, but not limited to, the EVS 110, the navigation system 120, the reference data source 130, and the display system 150, or any combination thereof.

The IPU 140 may be programmed or configured to receive as input data representative of information obtained from various systems and/or sources including, but not limited to, the EVS 110, the navigation system 120, and/or the reference data source 130. As embodied herein, the terms "programmed" and "configured" are synonymous. The IPU 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus, through a wireless network, or as a signal received and/or transmitted by the IPU 140 via a physical or a virtual computer port. The IPU 140 may be programmed or configured to execute one or both of the methods discussed in detail below and provide output data to various systems and/or units including, but not limited to, the display system 150.

In an embodiment of FIG. 1, the display system 150 could be any system comprised of at least one display unit configured to present images such as, but not limited to, an enhanced image, a horizontal situation indication, and a vertical situation indication. Although the following discussion is drawn toward display units physically installed in an aircraft, the embodiments disclosed herein may be applied to portable electronic devices configured with displays (e.g., laptop computers, electronic flight bags, handheld device, touch screen device, notebook, tablet, user-wearable device, etc. . . . ). The display unit could be comprised of, but not limited to, a Head-Up Display ("HUD"), Head-Down Display ("HDD"), Primary Flight Director, Navigation Display, Multi-Purpose Control Display Unit, EICAS, Electronic Centralized Aircraft Monitor, Multi-Function Display, Side Displays, and Data Link Control Display Unit.

Typically, the HUD is mounted in front of the pilot at windshield level and is directly in the pilot's field of vision, and the HDD is mounted to an aircraft's flight instrument panel located in front of a pilot and below the windshield and the pilot's field of vision. The HUD is advantageous because the display is transparent allowing the pilot to keep his or her eyes "outside the cockpit" while the display unit provides an enhanced image and or flight information to the pilot. Both the HUD and HDD could be employed as display units configured to present not only enhanced images and other images discussed herein but also images generated by a synthetic vision system and a combined vision. As embodied herein, the display system 150 could receive enhanced image data from the IPU 140 for subsequent processing as discussed herein.

In an embodiment of FIG. 1, the manual input device 160 could be any display image switching/selection device configured to allow the pilot or flight crew to make manual selections of or switching between displayed images. Such devices could include, but are not limited to, a tactile device (e.g., a physical keyboard with tactile buttons, control display unit, cursor control device, stylus, electronic grease pen, handheld device, touch screen device configured with interactive graphical user interfaces, notebook, tablet, electronic flight bag, etc. . . . ) and/or speech recognition systems. The manual input device could be integrated with the display system 150 if it is configured to receive manual input (e.g., portable electronic devices, electronic flight bags, handheld device, touch screen device, notebook, tablet, etc. . . . ). As embodied herein, the manual input device 160 could provide manual input data to the display system 150 for subsequent processing as discussed herein.

The advantages and benefits of the embodiments discussed herein may be illustrated in the drawings of FIGS. 2A through 4, inclusive, by showing how the integrity of an enhanced image can be verified either automatically or by the pilot, where the enhanced image is produced by the EVS 110 employing an active sensor 112 and one or more passive sensors 114. Referring to FIG. 2A, a runway environment 200 of a runway 202 at a decision point is shown, where the decision point may be a point in an approach procedure where the pilot decides whether to continue the approach to landing on the runway 202 or to begin a missed approach procedure. The runway environment 200 of FIG. 2A is comprised of runway edge lights 204, runway end lights 206, and a partial ALS 208. Furthermore, the ALS 208 is comprised of a plurality of approach lights structures 210 including a plurality of approach lights 212.

It should be noted that there are many possible lighting configurations of RLSs and/or ALSs that could be employed in a runway environment. The embodiments herein include any RLS/ALS configuration currently-employed and/or any RLS/ALS configuration that could be developed and employed to assist the pilot to visually identify the runway environment and/or align the aircraft with the runway. An RLS could be comprised of any lighting system installed in or around the surfaces of an airport, and an ALS could be comprised of any system installed on the approach end of a runway and comprised of a series of light bars, strobe lights, or any combination of these that extend outward from the threshold of the runway.

A non-exhaustive list for RLSs includes not only runway end lights and runway edge lights but also runway centerline lighting systems, touchdown zone lights, taxiway centerline lead-off lights, taxiway centerline lead-on lights, and land and hold short lights. A non-exhaustive list includes: a medium-intensity ALS with runway alignment indicator lights ("MALSR"), medium-intensity ALS with sequenced flashing lights ("MALSF"), simple ALS ("SALS"), simplified short ALS ("SSALS"), simplified short ALS with runway alignment indicator lights ("SSALR"), simplified short ALS with sequenced flashing lights ("SSALF"), omnidirectional ALS ("ODALS"), two configurations of an ALS with sequenced flashing lights ("ALSF"), two configurations of an ICAO-compliant high intensity ALS ("ICAO HIALS"), lead-in lighting ("LDIN"), runway end identification lights ("REIL"), and/or runway alignment indicator lights ("RAIL").

Referring to FIG. 2B, a runway environment of FIG. 2A is shown at a greater distance from the runway 202 shown in FIG. 2A. For the purpose of discussion, it will be assumed that the aircraft in FIG. 2B is 1 nautical mile away from runway and the pilot of the aircraft has commenced an instrument approach procedure under visual meteorological conditions such that the approach lights and approach lights structures of the ALS 222 are unobscured to the pilot's sight (as are the runway, runway edge lights, and runway end lights). Those skilled in the art may recognize that the configuration of the ALS 222 shown in FIG. 2B corresponds to the SSALR and MALSR configurations.

Figure 3A:
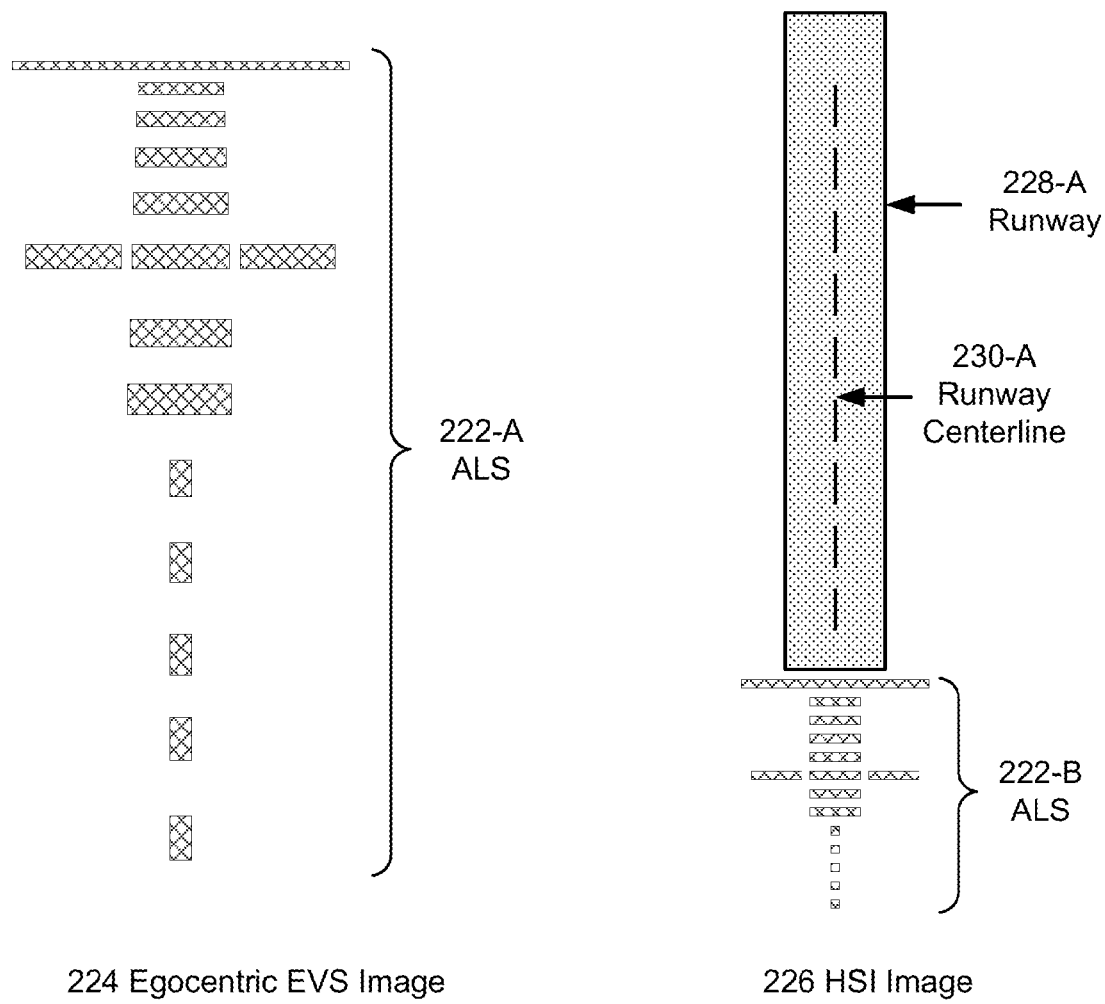
FIG. 3A illustrates three images comprised of approach lighting system generated from a radar-acquired three-dimensional model.

For the purpose of discussion in FIGS. 3A through 3G, inclusive, it will be assumed that the pilot has commenced an instrument approach procedure under instrument meteorological conditions reportedly having an RVR of 300 feet. As such, the pilot is unable to see more than 300 feet outside of the aircraft. Although the pilot is unable to visually see the actual ALS 222, the active sensor 112 installed is able to sense or detect the electromagnetic radiation being reflected off of the approach lights structures and compute a 3-D model. As shown in FIG. 3A, an egocentric EVS image 224 of the ALS 222-A may be generated from the 3-D model.

Furthermore, using navigation data (e.g., aircraft position and heading) provided by the navigation system 120 and runway data retrieved from the reference data source 130, a horizontal situation indicator ("HSI") image 226 may be generated, where the HSI image 226 may be comprised of a top-down depiction of a runway 228-A, a runway centerline 230-A, and a two-dimensional depiction of the ALS 222-B represented in the 3-D model. With this view, a determination of the integrity of the active sensor 112 is favorable because, as expected by the pilot, the ALS 222-B is aligned with an extension of the runway centerline 230-A.

Furthermore, a vertical situation indicator ("VSI") image 232 may be generated, where the VSI image 232 may be comprised of a side view depiction of a runway 228-B and a second two-dimensional depiction of the ALS 222-C represented in the 3-D model. With this view, the integrity of the active sensor 112 may be additionally verified because, as expected by the pilot, the approach lights structures of the ALS 222-B are shown as being approximately aligned.

Figure 3B:
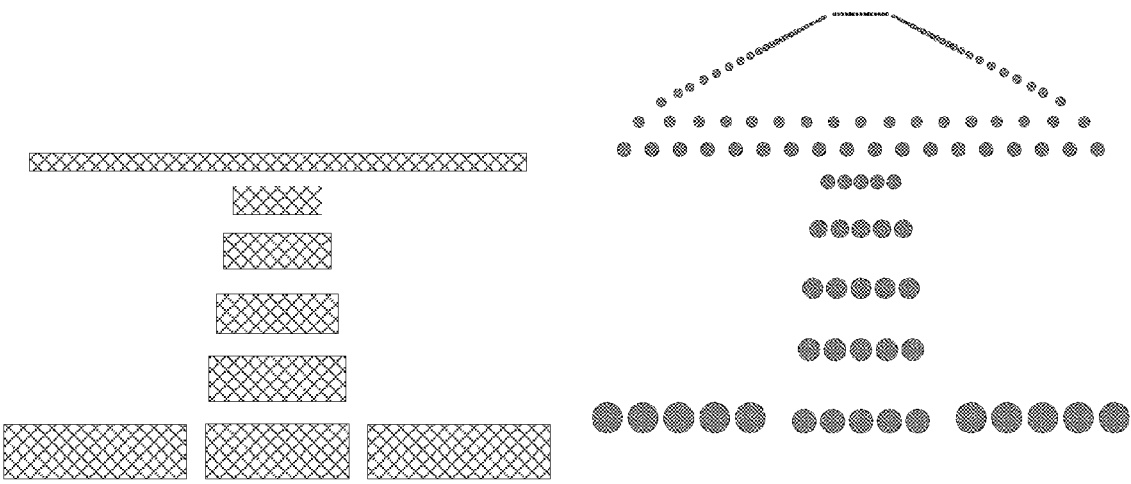
FIG. 3B illustrates separate enhanced images generated from separate inputs of active and passive sensors.

In addition to the integrity verification of the active sensor 112 and the enhanced image generated therefrom, the integrity of the passive sensors 114 may be verified using the active sensor-based enhanced image (e.g., the HSI image 226 and/or the VSI image 232) as a reference after the pilot has made a favorable verification. Referring to FIG. 3B, separate enhanced images generated from inputs of EVS 110 sensors is illustrated. Although the approach lights structures shown in FIG. 3B and generated from the active sensor 112 seem to agree with their corresponding parts of FIG. 2A, the integrity of the active sensor 112 (or an enhanced image generated therefrom) may not be determined without additional information. Likewise, although the runway edge lights, the runway end lights, and the approach lights shown in FIG. 3B and generated from the passive sensors 114 seem to agree with their corresponding parts of FIG. 2A, the integrity of the passive sensors 114 (or an enhanced image generated therefrom) may not be determined without additional information.

Figure 3C:
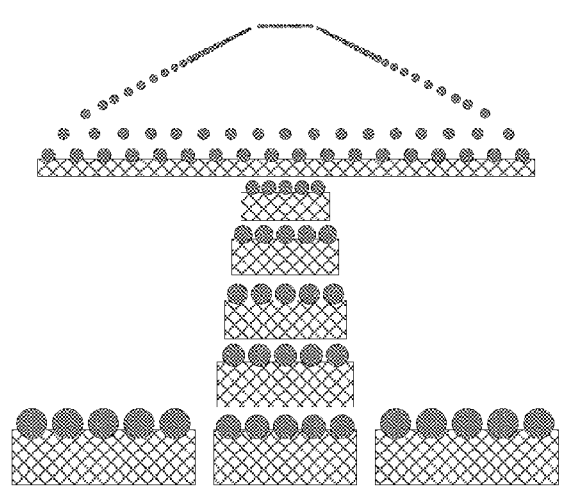
FIG. 3C illustrates a first combined enhanced image generated from inputs of both active and passive sensors.
Figure 3D:
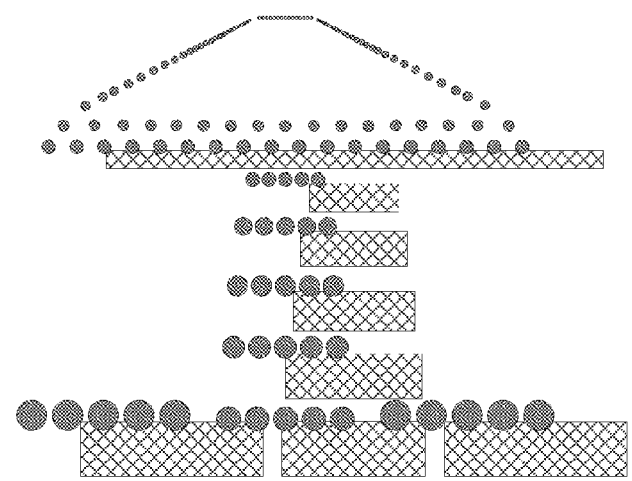
FIG. 3D illustrates a second combined enhanced image generated from inputs of both active and passive sensors.
Figure 3E:
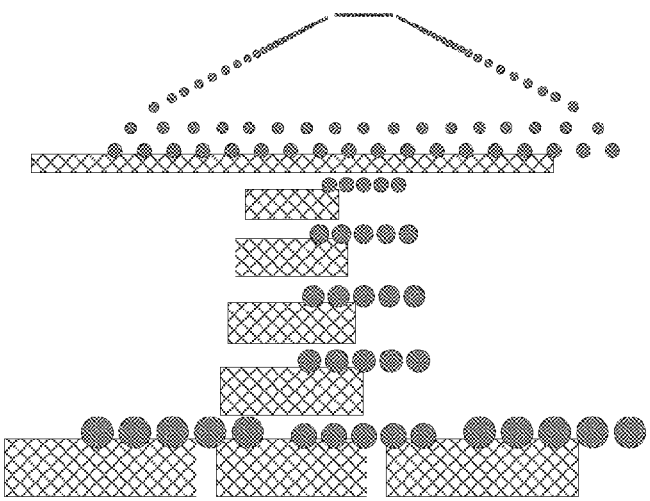
FIG. 3E illustrates a third combined enhanced image generated from inputs of both active and passive sensors.
Figure 3F:
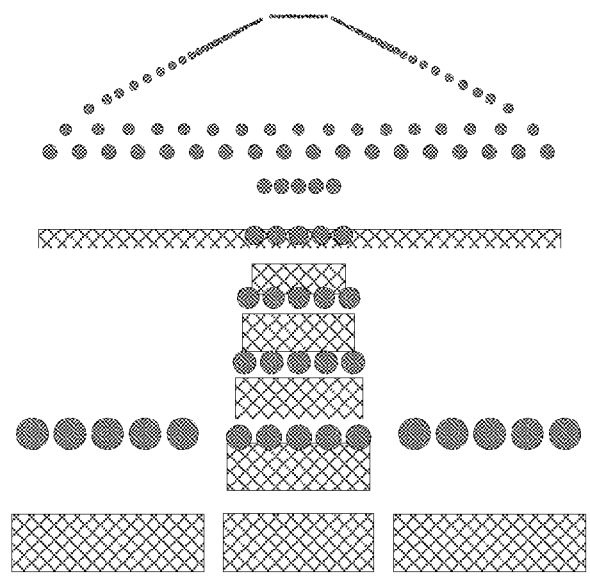
FIG. 3F illustrates a fourth combined enhanced image generated from inputs of both active and passive sensors.
Figure 3G:
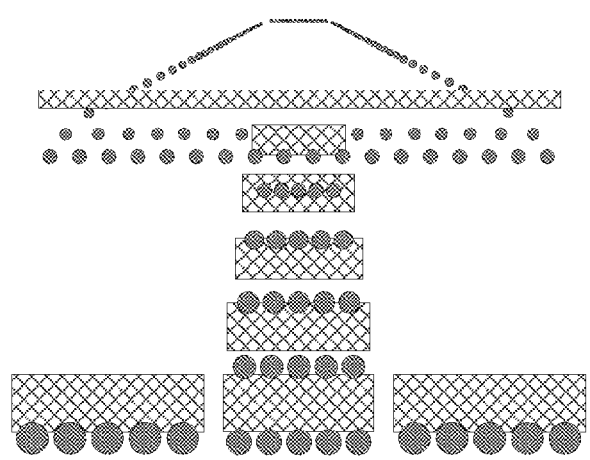
FIG. 3G illustrates a fifth combined enhanced image generated from inputs of both active and passive sensors.

Referring to FIG. 3C an enhanced image generated from inputs of both the active sensor 112 and passive sensors 114 is illustrated. Moreover, a comparison of the approach lights and approach lights structures of the enhanced image with their corresponding parts of FIG. 2A indicates a proper alignment of the approach lights structures and approach lights. Because the integrity of the active sensors 112 has been verified, a favorable determination of integrity of the passive sensors 114 may be made because the approach lights shown in the enhanced image generated from the inputs of passive sensors 114 are properly aligned with the approach lights structures shown in the enhanced image generated from the inputs of the verified active sensor 112.

Referring to FIGS. 3D through 3G, enhanced images generated from inputs of both the active sensor 112 and passive sensors 114 are illustrated. A comparison of the approach lights and approach lights structures of the enhanced images shown in FIGS. 3D through 3G with their corresponding parts of FIG. 2A, however, indicates a non-alignment or improper alignment of the approach lights structures and approach lights. Because the integrity of the active sensors 112 has been verified, a favorable determination of integrity of the passive sensors 114 may not be made (or an unfavorable determination may be made) because the image of the approach lights generated from the inputs of passive sensors 114 are not properly aligned with the approach lights structures generated from the inputs of the verified active sensor 112.

Although the examples discussed in FIGS. 3A through 3G assumed a favorable integrity verification of the active sensors 112 (and the enhanced image generated therefrom) in order to determine a favorable or unfavorable integrity verification of the passive sensors 114 (and an enhanced image generated therefrom), there may be a time when a favorable integrity determination of the active sensors 112 is not possible (or an unfavorable integrity determination is possible).

Figure 4:
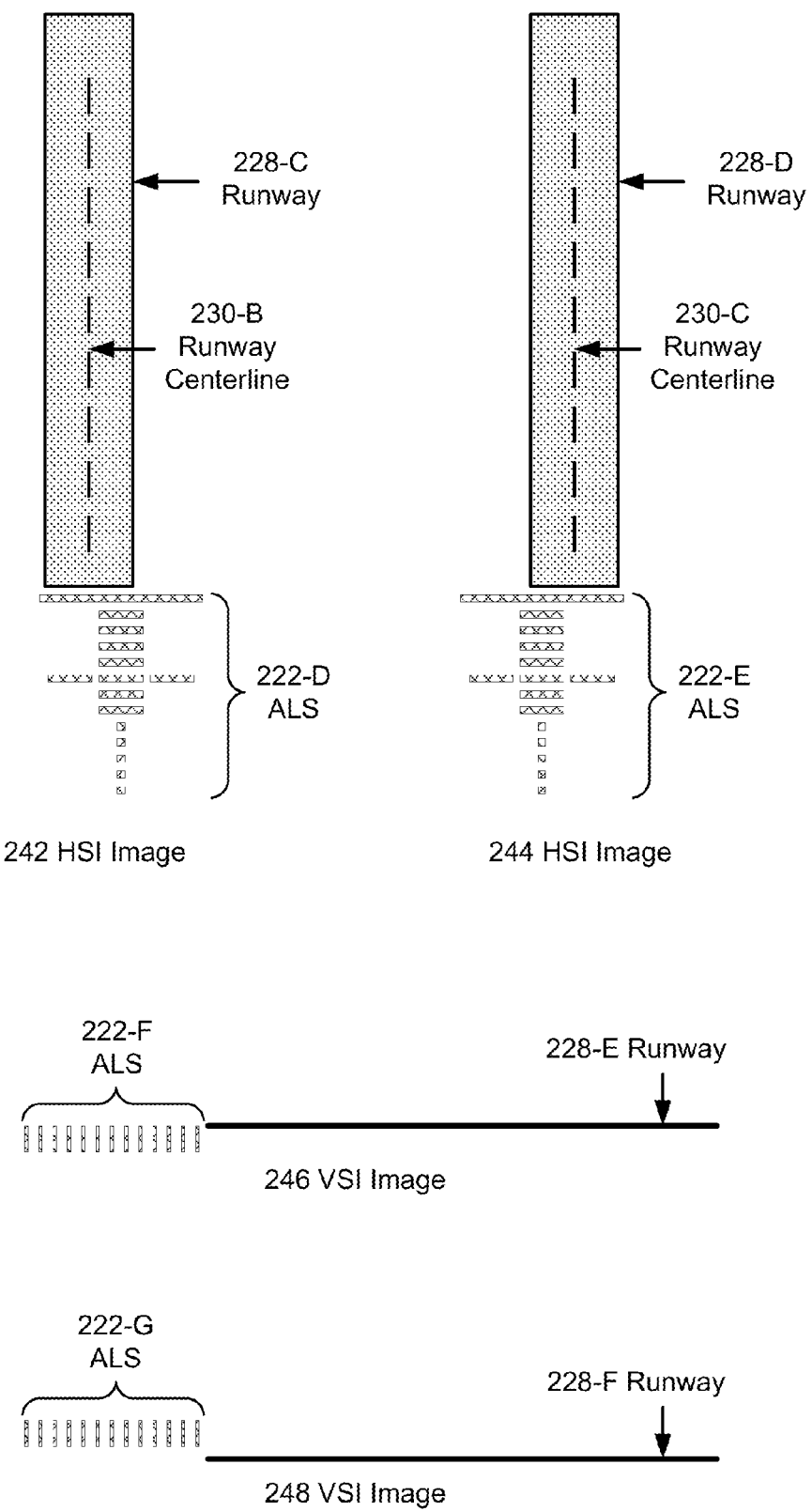
FIG. 4 illustrates four images comprised of approach lighting systems generated from a radar-acquired three-dimensional model.

As discussed above for FIG. 3A, an egocentric EVS image 224 of the ALS 222-A may be generated from the 3-D model computed from the inputs of the active sensor 112. Without additional information, the integrity of the active sensor 112 and the egocentric EVS image 224 cannot be verified. Referring to FIG. 4, an HSI image 242 has been generated comprised of a top-down depiction of a runway 228-C, a runway centerline 230-B, and a two-dimensional depiction of the ALS 222-D represented in the 3-D model. With this view, a determination of the integrity of the active sensor 112 is unfavorable because, as unexpected by the pilot, the ALS 222-D is misaligned with an extension of the runway centerline 230-B. Because an unfavorable determination of integrity of the active sensor 112 has been made, the active sensor 112 may not act as a reference in determining the integrity of the passive sensors 114 (or an enhanced image generated therefrom).

Likewise, an HSI image 244 has been generated comprised of a top-down depiction of a runway 228-D, a runway centerline 230-C, and a two-dimensional depiction of the ALS 222-E represented in and derived from the 3-D model. With this view, a determination of the integrity of the active sensor 112 is unfavorable because, as unexpected by the pilot, the ALS 222-E is misaligned with an extension of the runway centerline 230-C. Because an unfavorable determination of integrity of the active sensor 112 has been made, the active sensor 112 may not act as a reference in determining the integrity of the passive sensors 114 (or an enhanced image generated therefrom).

Similarly, a VSI image 246 has been generated comprised of side view depiction of a runway 228-E and a two-dimensional depiction of the ALS 222-F represented in and derived from the 3-D model. With this view, a determination of the integrity of the active sensor 112 is unfavorable because, as unexpected by the pilot, the ALS 222-F is misaligned with the runway 228-E. Because an unfavorable determination of integrity of the active sensor 112 has been made, the active sensor 112 may not act as a reference in determining the integrity of the passive sensors 114 (or an enhanced image generated therefrom).

Likewise, a VSI image 248 has been generated comprised of side view depiction of a runway 228-F and a two-dimensional depiction of the ALS 222-G represented in the 3-D model. With this view, a determination of the integrity of the active sensor 112 is unfavorable because, as unexpected by the pilot, the ALS 222-G is misaligned with the runway 228-F. Because an unfavorable determination of integrity of the active sensor 112 has been made, the active sensor 112 may not act as a reference in determining the integrity of the passive sensors 114 (or an enhanced image generated therefrom).

Figure 5:
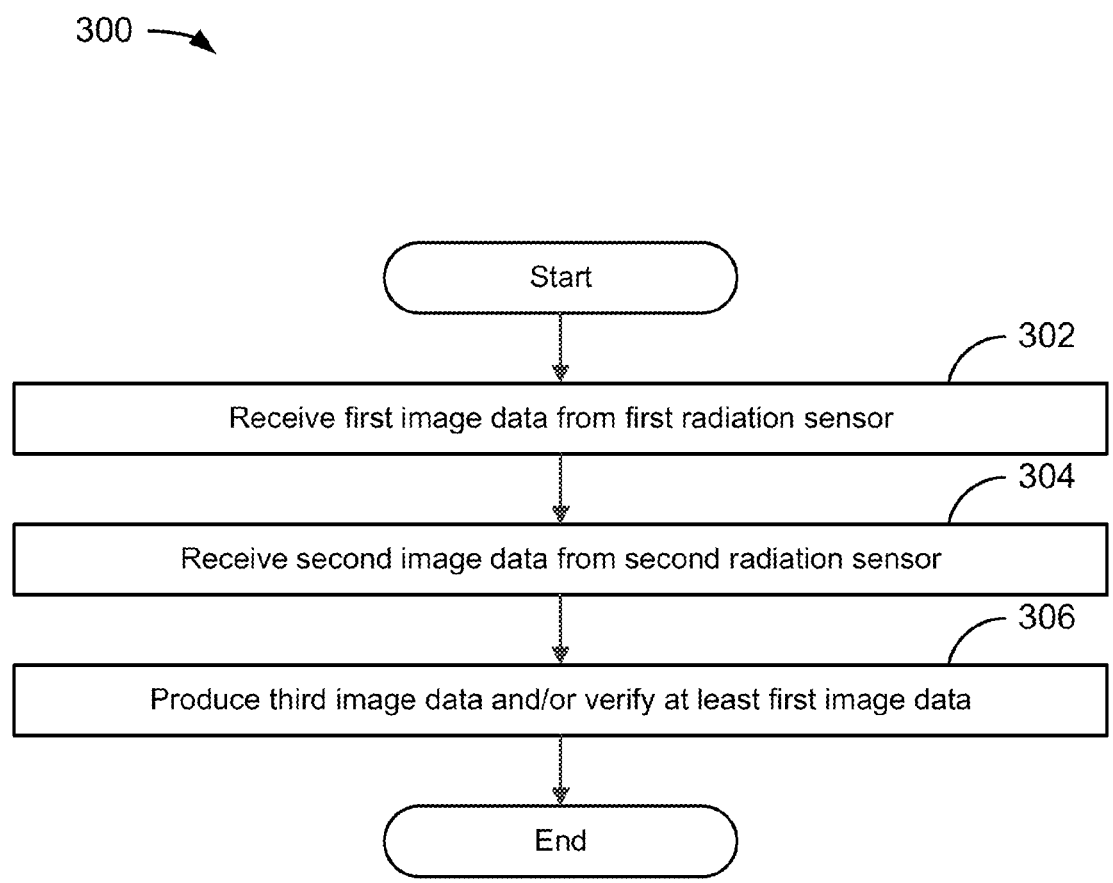
FIG. 5 depicts an exemplary embodiment of a flowchart disclosing a method for determining the integrity of a sensor-based image(s) according to the inventive concepts disclosed herein.

FIG. 5 depicts flowchart 300 providing an example for generating a sensor-based image(s), where the IPU 140 may be programmed or configured with instructions corresponding to the following modules. As embodied herein, the IPU 140 may be a processor unit of a module such as, but not limited to, a printed circuit card assembly having one or more input interfaces (e.g., virtual or physical computer ports) to facilitate data communications with the IPU 140, i.e., the receiving and providing of data (e.g., one or more electrical or optical signals including data and/or being indicative of data). For the accomplishment of the following modules embodied in FIG. 5, the receiving of data is synonymous and/or interchangeable with the retrieval of data, and the providing of data is synonymous and/or interchangeable with the making available, supplying, and/or sending of data.

The method of flowchart 300 begins with module 302 with the receiving of first image data representative a first image of an external scene, the scene outside an aircraft. The first image data could be acquired by first radiation sensors such as the passive sensor(s) 114 employed by the EVS 110. The passive sensors 114 may be designed or configured to acquire radiation within a first range of the electromagnetic spectrum. The first image data could be comprised of streaming video data. As embodied herein, the external scene represented in the first image data could be comprised of an egocentric scene (i.e., a scene presented egocentrically) presentable to the pilot at a decision point.

The method of flowchart 300 continues with module 304 with the receiving of second image data representative of the external scene. The second image data could be generated from data that has been acquired by second radiation sensors such as the active sensor(s) 112 employed by the EVS 110, where such data could be mapped into a 3-D model from which the second image data is generated.

The active sensor 112 may be designed or configured to acquire radiation within a second range of the electromagnetic, where the first and second ranges of the electromagnetic spectrum may be non-overlapping. As embodied herein, the external scene represented in the second image data could be comprised an egocentric scene presentable to the pilot at a decision point.

The method of flowchart 300 continues with module 306 with the performing of one or more operations. A first operation could be the combining of the first image data (e.g., as shown in the right-hand image of FIG. 3B) with the second image data (e.g., as shown in the left-hand image of FIG. 3B) to produce a third image data (e.g., FIGS. 3C through 3G) representative of a third image of the external scene, where the third image is comprised of an egocentric image. As embodied herein, the third image could be comprised of both the first image and the second image.

The second operation could be the determining of the integrity of the first image data by comparing the first image data with the second image data through the use of one or more comparison algorithms. In one embodiment, this comparison could be performed before the first image data and the second image data are combined to produce the third image data. In another embodiment, this comparison could be performed after the first image data and the second image data have been combined to produce the third image data. A favorable determining of integrity could follow with the performance of the first operation.

In an additional embodiment, the first image data, the second image data, the third image data, or any combination of these could be provided to the display system 150 configured to receive one or more of these. The image represented in the first image data, the second image data, and/or the third image data could be presented on one or more display units of the display system 150.

In an additional embodiment, a source of manual input data could be provided. If provided, the pilot may visually verify the integrity of the first image by switching between the first image and the second image or the third image and observing whether or not there is alignment between the first and second images or the first and third images, where the second image has been determined as having favorable integrity. As embodied herein, favorable integrity of the second image may be determined by the pilot performing a visually verification of lighting found within a runway environment as presented in an HSI (e.g., see FIG. 3A), where within such indication may include a fourth image of runway environment lighting represented in fourth image data and generated from the data acquired through the second radiation sensor (e.g., the active sensor 112) as discussed above.

In an additional embodiment, fifth image data representative of a fifth image may be generated, where the fifth image could be presentable in a VSI (e.g., see FIG. 3A). As embodied herein, the fifth image data may be generated from the data acquired through the second radiation sensor (e.g., the active sensor 112) as discussed above. Then, the flowchart 300 proceeds to the end.

It should be noted that the method steps described above may be embodied in computer-readable media stored in a non-transitory computer-readable medium as computer software. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for determining the integrity of at least one sensor-based image, comprising:
   a source of first image data, where
      the first image data is representative of a first two-dimensional (2D) image of a runway generated from navigation data representative of at least aircraft position and heading data, and
      fixed reference data representative of the runway;
   a source of second image data, where
      the second image data is representative of a second 2D image of a plurality of lighting structures of a lighting system of the runway generated from
      the navigation data, and
      three-dimensional (3D) data acquired through an active radiation sensor configured to transmit radiation and receive the transmitted radiation reflected by the plurality of lighting structures; and
   an image processing unit including at least one processor coupled to a non-transitory processor-readable medium storing processor-executable code and configured to:
      receive the first image data;
      receive the second image data; and
      provide the first image data and the second image data to a display system, whereby
         the first 2D image and the second 2D image are presented to a viewer, thereby
            enabling the viewer to visually determine an integrity of at least one of the active radiation sensor and the second image data.

2. The system of claim 1, wherein the image processing unit is a processing unit of at least one of the source of first image data and the source of second image data.

3. The system of claim 1, wherein the first 2D image and the second 2D image are presented in a horizontal situation indication.

4. The system of claim 1, wherein the first 2D image and the second 2D image are presented in a vertical situation indication.

5. The system of claim 4, further comprising:
   a source of third image data, where
      the third image data is representative of a third 2D image of the runway generated from the navigation data and the fixed reference data; and
   a source of fourth image data, where
      the fourth image data is representative of a fourth 2D image of the plurality of lighting structures generated from the navigation data and the 3D data, where
      the image processing unit is further configured to:
         receive the third image data,
         receive the fourth image data, and
         provide the third image data and the fourth image data to the display system, whereby
            the third 2D image and the fourth 2D image are presented in a horizontal situation indication.

6. The system of claim 1, wherein the determination of the integrity is favorable when an extension of a runway centerline of the runway presented in the first 2D image is aligned with the plurality of lighting structures of the runway presented by the second 2D image.

7. The system of claim 1, further comprising:
   a source of third image data, where
      the third image data is representative of a third 2D image of a plurality of lights of the lighting system generated from data acquired through at least one passive radiation sensor configured to receive radiation emitted by the plurality of lights; and
   a source of fourth image data, where
      the fourth image data is representative of a fourth 2D image of the plurality of lighting structures generated from the 3D data, where the image processing unit is further configured to:
  receive the third image data;
  receive the fourth image data; and
  provide the third image data and the fourth image data to the display system, whereby
    the third 2D image and the fourth 2D image are presented to the viewer, thereby
      enabling the viewer to visually determine an integrity of the at least one passive radiation sensor and the third image data.

8. The system of claim 7, wherein the source of second image data and the source of fourth image data are the same source of image data.

9. The system of claim 7, wherein the image processing unit is a processing unit of at least one of the source of first image data, the source of second image data, the source of third image data, and the source of fourth image data.

10. The system of claim 7, wherein the determination of the integrity of the at least one passive radiation sensor and the third image data is favorable when
  the determination of the integrity of the at least one of the active radiation sensor and the second image data is favorable, and
  the plurality of lights presented in the third 2D image is aligned with the plurality of lighting structures presented in the fourth 2D image.

11. A device for determining the integrity of at least one sensor-based image, comprising:
  an image processing unit including at least one processor coupled to a non-transitory processor-readable medium storing processor-executable code and configured to:
    receive first image data representative of a first two-dimensional (2D) image of a runway generated from
      navigation data representative of at least aircraft position and heading data, and
      fixed reference data representative of the runway;
    receive second image data representative of a second 2D image of a plurality of lighting structures of a lighting system of the runway generated from
      the navigation data, and
      three-dimensional (3D) data acquired through an active radiation sensor configured to transmit radiation and receive the transmitted radiation reflected by the plurality of lighting structures; and
    provide the first image data and the second image data to a display system, whereby
      the first 2D image and the second 2D image are presented to a viewer, thereby
        enabling the viewer to visually determine an integrity of at least one of the active radiation sensor and the second image data.

12. The device of claim 11, wherein the first 2D image and the second 2D image are presented in a horizontal situation indication.

13. The device of claim 11, wherein the first 2D image and the second 2D image are presented in a vertical situation indication.

14. The device of claim 13, wherein
the image processing unit is further configured to:
  receive third image data representative of a third 2D image of the runway generated from the navigation data and the fixed reference data;
  receive fourth image data representative of a fourth 2D image of the plurality of lighting structures generated from the navigation data and the 3D data; and
  provide the third image data and the fourth image data to the display system, whereby
    the third 2D image and the fourth 2D image are presented in a horizontal situation indication.

15. The device of claim 11, wherein
the image processing unit is further configured to:
  receive third image data representative of a third 2D image of a plurality of lights of the lighting system generated from data acquired through at least one passive radiation sensor configured to receive radiation emitted by the plurality of lights;
  receive fourth image data representative of a fourth 2D image of the plurality of lighting structures generated from the 3D data; and
  provide the third image data and the fourth image data to the display system, whereby
    the third 2D image and the fourth 2D image are presented to the viewer, thereby
      enabling the viewer to visually determine an integrity of the at least one passive radiation sensor and the third image data.

16. A method for determining the integrity of at least one sensor-based image, comprising:
  receiving, by an image processing unit including at least one processor coupled to a non-transitory processor-readable medium storing processor-executable code, first image data representative of a first two-dimensional (2D) image of a runway generated from
    navigation data representative of at least aircraft position and heading data, and
    fixed reference data representative of the runway;
  receiving second image data representative of a second 2D image of a plurality of lighting structures of a lighting system of the runway generated from
    the navigation data, and
    three-dimensional (3D) data acquired through an active radiation sensor configured to transmit radiation and receive the transmitted radiation reflected by the plurality of lighting structures; and
  providing the first image data and the second image data to a display system, whereby
    the first 2D image and the second 2D image are presented to a viewer, thereby
      enabling the viewer to visually determine an integrity of at least one of the active radiation sensor and the second image data.

17. The method of claim 16, wherein the first 2D image and the second 2D image are presented in a horizontal situation indication.

18. The method of claim 16, wherein the first 2D image and the second 2D image are presented in a vertical situation indication.

19. The method of claim 18, further comprising:
  receiving third image data representative of a third 2D image of the runway generated from the navigation data and the fixed reference data;
  receiving fourth image data representative of a fourth 2D image of the plurality of lighting structures generated from the navigation data and the 3D data; and
  providing the third image data and the fourth image data to the display system, whereby
    the third 2D image and the fourth 2D image are presented in a horizontal situation indication.

20. The method of claim 16, further comprising:
  receiving third image data representative of a third 2D image of a plurality of lights of the lighting system generated from data acquired through at least one passive radiation sensor configured to receive radiation emitted by the plurality of lights;

receiving fourth image data representative of a fourth 2D image of the plurality of lighting structures generated from the 3D data; and providing the third image data and the fourth image data to the display system, whereby
the third 2D image and the fourth 2D image are presented to the viewer, thereby
enabling the viewer to visually determine an integrity of the at least one passive radiation sensor and the third image data.

\* \* \* \* \*